United States Patent [19]

Koken

[11] 4,414,707
[45] Nov. 15, 1983

[54] SAUSAGE CASING REMOVAL APPARATUS

[75] Inventor: Ernest E. Koken, Madison, Wis.

[73] Assignee: Oscar Mayer & Co., Inc., Madison, Wis.

[21] Appl. No.: 278,986

[22] Filed: Jun. 30, 1981

[51] Int. Cl.$^3$ .............................................. A22C 11/00
[52] U.S. Cl. ............................................. 17/1 F; 17/49
[58] Field of Search ............................. 17/1 F, 49, 34

[56] References Cited

U.S. PATENT DOCUMENTS

| 2,702,404 | 2/1955 | Rufenach | 17/1 F |
| 3,312,995 | 4/1967 | Garey | 17/1 F |
| 4,118,828 | 10/1978 | Melanson | 17/1 F |

Primary Examiner—Willie G. Abercrombie
Attorney, Agent, or Firm—Lockwood, Dewey, Alex & Cummings

[57] ABSTRACT

An apparatus for removing the casing from sausages is improved by modifying the product loading horn with a structure that brings about venturi effects whereby fluid for conditioning the casing is impelled through the product loading horn and contacts the casing within the product loading horn at a velocity greater than the velocity at which the conditioning fluid is supplied to the apparatus. The venturi aspects of the apparatus insure thorough conditioning of the casing while substantially eliminating escape of the conditioning fluid to the environment. The improved structure includes restricted passageways at fluid interfaces where the conditioning fluid enters the product loading horn and after the conditioning fluid exits the product loading horn.

11 Claims, 4 Drawing Figures

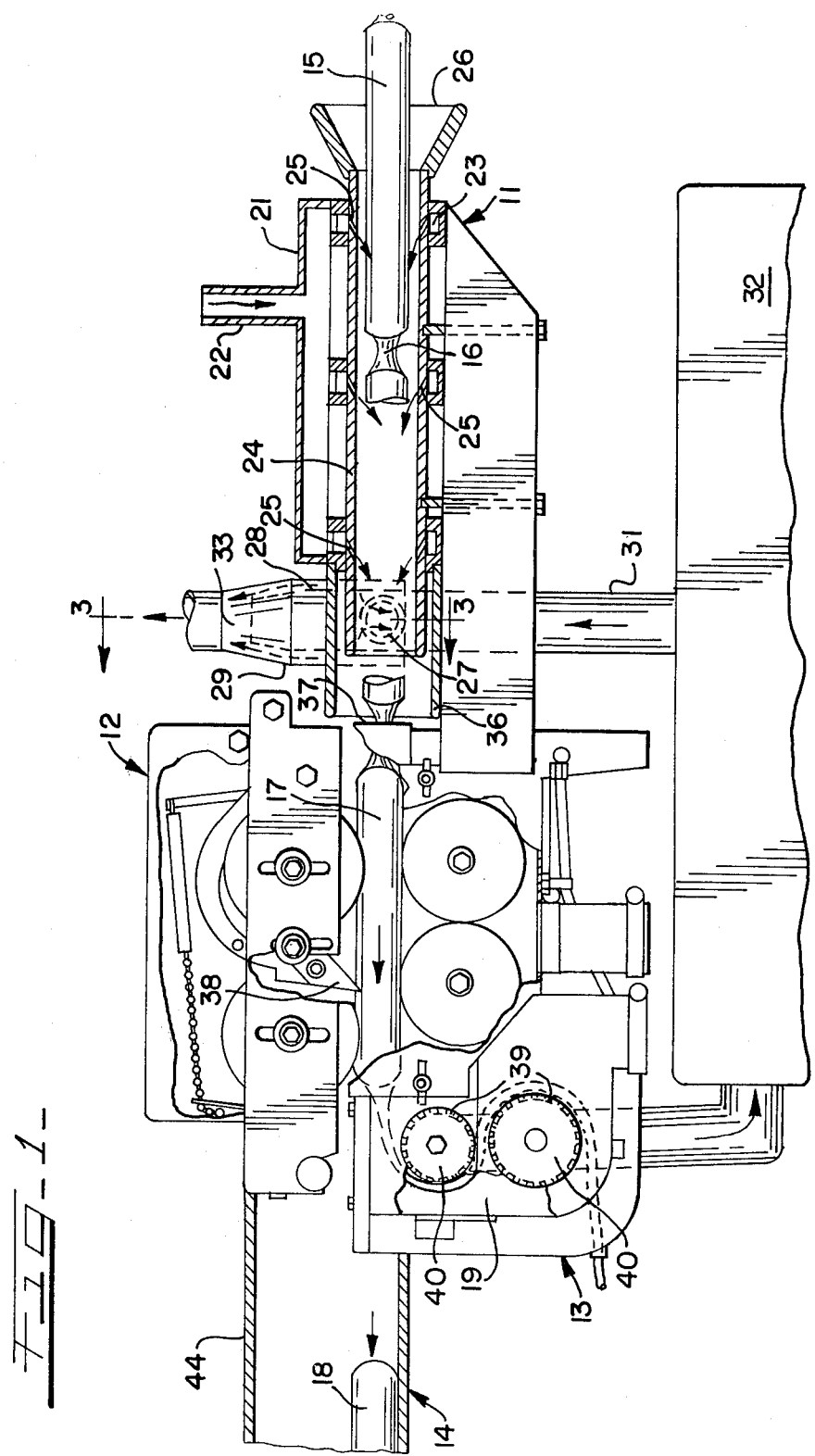

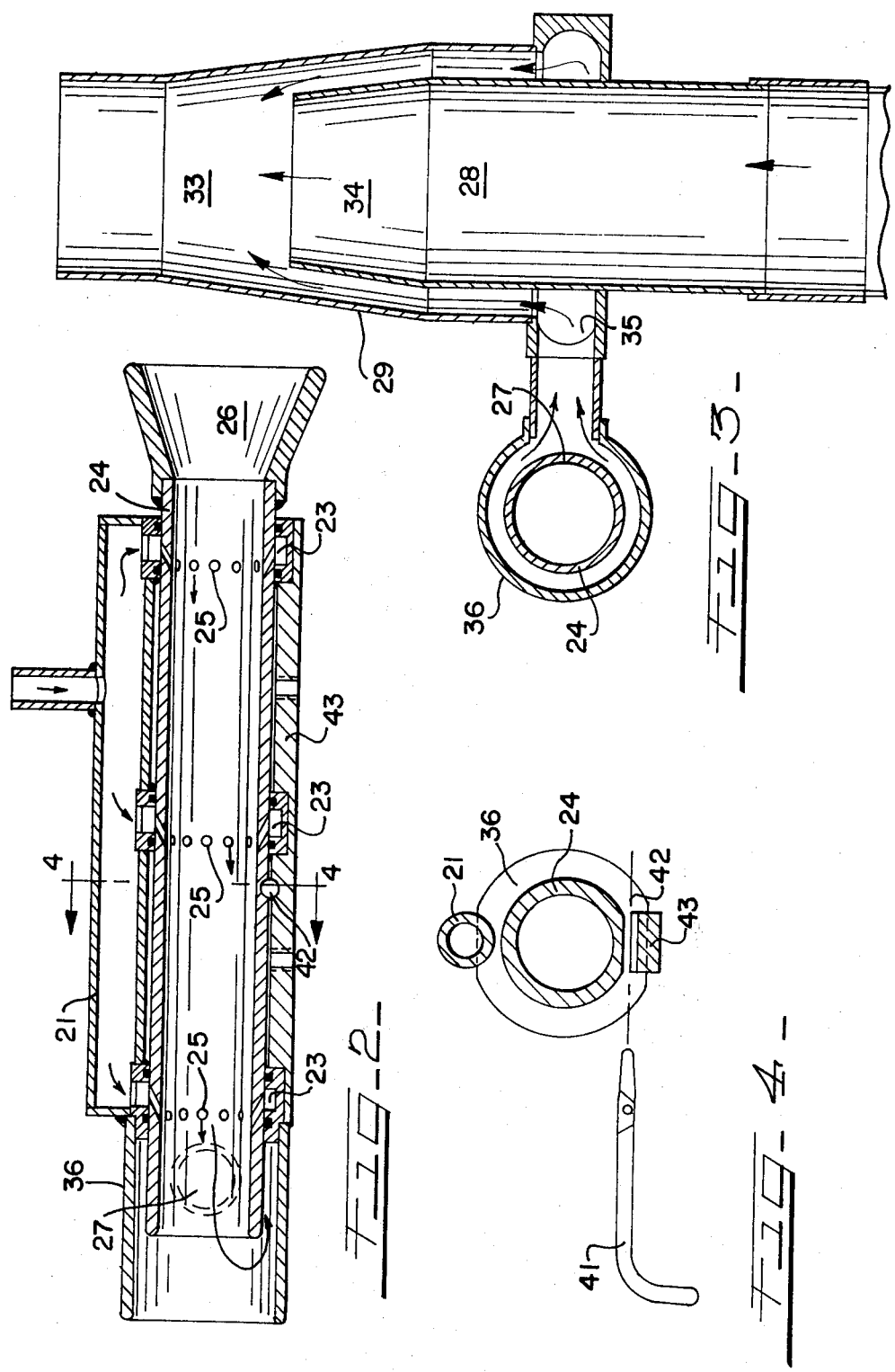

SAUSAGE CASING REMOVAL APPARATUS

This invention generally relates to an improved apparatus for removing casing from sausages. More particularly, this invention relates to an improved structure for enhancing the distribution and effectiveness of the flow of conditioning fluid through an apparatus for removing the casing from sausages.

Devices for removing sausage casings are well known in the meat processing industry and are exemplified by U.S. Pat. No. 3,312,995, wherein a stream of sausages, typically linked together by a continuous casing, are conveyed along a sausage trackway having a plurality of operational stations. The usual apparatus of this type includes the following operational stations: a product loading horn having means for contacting the casing with conditioning fluid, means for longitudinally slitting the conditioned casing, and means for separating the slit casing from the sausages. Usually, conditioning of the casing includes heating the casings as they pass through a product loading horn at the upstream end of the trackway. In some casing removal devices, the conditioning fluid (most typically steam) actually enters the product loading horn and contacts the casing.

The conditioning fluid renders the casing more pliable and loosens the casing from around the sausages. With the casing thus conditioned, the casing is more readily slit longitudinally as the links pass by and engage a sharp blade of the slitting means. After the longitudinal slit has been formed, the slit casing is removed from the sausages, typically by a supply of compressed air, by the operation of a vacuum, or by a combination thereof. However, the effectiveness and the efficiency of the conditioning fluid are sometimes hampered because either (1) the fluid is contained within a jacket or (2) the fluid passively enters and exits the loading horn whereby the fluid does not flow smoothly and rapidly through the product loading horn, but rather tends to stagnate within the apparatus and escape into the environment.

Accordingly, there has developed a need for improvements in the conditioning of sausage casings in order to carry out this procedure in a more efficient, controlled and effective manner. Applicant has discovered that venturi-type passage of a conditioning fluid (such as steam) directly onto and along the casings in the general direction of casing movement provides a substantial improvement in the overall task of removing the casing from sausages. By the present invention, the flow of the conditioning fluid through the apparatus is controlled by directing the fluid along and with the flow of the sausages and by accelerating the fluid in a venturi-like manner so as to generally enhance flow velocity, by which undesirable stagnation and escape into the environment are minimized.

Accordingly, a general object of this invention is to provide an improved apparatus by which the casing is removed from sausages.

Another object of the present invention is to provide an improved apparatus having an especially efficient and effective flow of conditioning fluid.

Another object of this invention is to provide an improved product loading horn for conditioning sausages within a casing prior to slitting and removal of the casing from the sausages.

Another object of the present invention is to provide an improved sausage casing removal apparatus utilizing venturi principles to substantially avoid (1) stagnation of the conditioning fluid and (2) escape of the conditioning fluid from the apparatus.

These and other objects of the present invention will become apparent from the following detailed description and drawings, wherein:

FIG. 1 is a side elevational view, partially in cross-section and partially broken away, of the preferred apparatus according to this invention;

FIG. 2 is a detailed cross-sectional view of the product loading horn assembly of the apparatus illustrated in FIG. 1;

FIG. 3 is a cross-sectional view along the line 3—3 of FIG. 1; and

FIG. 4 is a cross-sectional view along the line 4—4 of FIG. 2.

The apparatus as a whole as illustrated in FIG. 1 includes a conditioning assembly generally designated as 11, a slitting assembly generally referred to as 12, and a separating assembly including a casing puller means 13 and a skinned sausage collection passageway 14. A trackway for sausage passage through the apparatus is provided by alignment of the conditioning assembly 11, the slitting assembly 12 and the collection passageway 14 in a manner whereby sausages pass through in a generally unobstructed manner. Progression of sausages through the trackway begins with encased sausages 15 which may be linked together by their casing 16 as shown. Downstream are conditioned sausages 17, which are subsequently longitudinally slit as they pass through the slitting assembly 12. Downstream of the slitting assembly 12, the trackway receives stripped (i.e., casing-free) sausages 18, with the casing 19 being removed by the puller means 13.

More particularly, the conditioning assembly 11 includes a manifold 21 that is in fluid passing communication with a conditioning fluid supply conduit 22 for introducing a conditioning fluid into the conditioning assembly 11. Typically, the fluid supply conduit 22 passes steam to the manifold 21 from a stream supply (not shown). As illustrated in FIG. 2, the manifold 21 opens into one or more peripheral channesl 23 that in turn open into a product loading horn 24 through restricted, directed passageways 25. These restricted passageways 25 are spaced along the circumference of the product loading horn 24. The passageways 25 are also structured to direct the conditioning fluid in a downstream direction away from the inlet 26.

A venturi effect occurs as the conditioning fluid passes through the restricted passageway 25 which are smaller in total cross-section than the axially-extending peripheral area of the channels 23, whereby the conditioning fluid is accelerated, the acceleration being especially great with respect to generally still air within and immediately outside of the inlet 26. This acceleration of the conditioning fluid creates a negative pressure with respect to that of the relatively still air within the product loading horn 24 and inlet 26. In order to equilibrate this pressure divergence, air outside of the inlet 26 moves toward the source of negative pressure and in the downstream direction into the inlet 26, through the product loading horn 24, and toward an exhaust port 27, whereby the conditioning fluid does not escape to any appreciable extent from the inlet 26. Accordingly, the plurality of restricted, directed passageways 25 function both to rapidly and effectively direct the conditioning fluid toward the exhaust port 27 as well as to minimize the escape through the inlet 26.

Air and conditioning fluid that are within the product loading horn 24 are enhanced in their passage through the exhaust port 27 by a venturi structure located downstream of the exhaust port 27, which venturi structure includes an inner sleeve 28 and an outer sleeve 29. Typically, as shown, the inner sleeve 28 is in fluid passing communication with a blower conduit 31 from the discharge end of a blower system 32 of substantially known construction. The relatively high pressure of the exhaust fluids (primarily air) passing through the inner sleeve 28 produces a high velocity within a narrowing throat section 33. This high velocity, which is preferably increased by a narrowing taper 34 at the discharge end thereof, produces a resulting low pressure within the narrowing throat section 33 to thereby "pull" gasses into the outer sleeve 29 and through the exhaust port 27 from the product loading horn 24. This is a venturi effect which urges passage of the conditioning fluid through and out of the exhaust port 27 while simultaneously further enhancing the flow of the conditioning fluid in a downstream direction through the product loading horn 24 and away from the inlet 26.

This exhaust venturi system can be seen in more detail in FIG. 3. The exhaust port 27 opens into an exhaust ring 35, which in turn opens into the outer sleeve 29 in order to provide a generally unrestricted flow of conditioning fluid between the product loading horn 24 and the narrowing throat section 33, which flow is significantly enhanced by the venturi effect created at the throat 33.

In order to enhance the flow of conditioning fluid and air through the product loading horn 24 and the exhaust port 27, an outlet sleeve 36 of the conditioning assembly 11 is spaced from the slitting assembly 12 so as to form a gap 37. Air from the environment passes through the gap 37, into the outlet sleeve 36 and into the downstream end of the product loading horn 24 in order to reduce any substantial pressure buildup downstream of the exhaust port 27.

After the casings of the conditioned sausages 17 are slit by a knife point 38 of the slitting assembly 12 of known construction, the casing is drawn generally downwardly by the casing puller means 13 also of known construction. The vacuum developed within the low pressure side of the blower system 32 "pulls" gasses through orifices 39 positioned along the circumferential face of vacuum wheels 40 in order to remove the casing 19.

In accordance with another feature of this invention, the skinned sausage collecting passageway 14 is enclosed in order to prevent escape of conditioning fluid from the apparatus. By this structure, which includes a top panel 44, conditioning fluids that may have passed through the slitting assembly 12 from the conditioning assembly 11 will be collected through the vacuum wheels 40 and will not be vented into the atmosphere around the apparatus, thus improving working conditions and also eliminating a possible source of contamination at the collection passageway 14.

FIG. 4 illustrates structure whereby the product loading horn 24 is easily removed from the remainder of the conditioning assembly 11 by virtue of removal of an anchoring pin 41 from a key hole 42 through the product loading horn 24 and a longitudinal base 43 of the conditioning assembly 11. The combination of the anchoring pin 41 and the key hole 42 also assures proper alignment of the passageways 25 with the peripheral channels 23. When desirable to remove the product loading horn 24, the anchoring pin 41 is removed from the key hole 42, and the product loading horn 24 is slid out of alignment within the peripheral channels 23 and entirely out of the conditioning assembly 11.

This invention can be embodied in various forms and, therefore, is to be construed and limited only by the scope of the appended claims.

I claim:

1. In a sausage casing removal apparatus comprising a sausage trackway and means for conveying sausages along the trackway, the trackway having a plurality of operational stations including (a) a conditioning assembly having a product loading horn having means for contacting the casing of the sausage with conditioning fluid while the sausage is conveyed along the trackway, (b) means for longitudinally slitting the conditioned casing, and (c) means for removing the slit casing from the sausages, said slit casing removing means being downstream of said conditioning assembly, the improvement comprising:

the conditioning assembly having venturi means for impelling the conditioning fluid through the product loading horn at a velocity greater than that velocity at which the conditioning fluid is supplied to the conditioning assembly; and the venturi means including a plurality of restricted passageways through the product loading horn of the conditioning assembly, fluid directing means overlies the restricted passageways along a peripheral area of the conditioning assembly, and the restricted passageways have a total cross-sectional area less than the peripheral area of the fluid directing means.

2. The apparatus of claim 1, wherein the venturi means includes restricted passageways at multiple fluid interfaces, one fluid interface being said plurality of restricted passageways through the product loading horn, and another fluid interface being downstream of a fluid exhaust port of the conditioning assembly.

3. The apparatus of claim 1, wherein the restricted passageways have an inlet and an outlet and the restricted passageways are at an angle through the product loading horn such that the outlet is downstream of the inlet.

4. In a sausage casing removal apparatus comprising a sausage trackway and means for conveying sausages along the trackway, the trackway having a plurality of operational stations including (a) a conditioning assembly having a product loading horn having means for contacting the casing of the sausage with conditioning fluid while the sausage is conveyed along the trackway, (b) means for longitudinally slitting the conditioned casing, and (c) means for removing the slit casing from the sausages, wherein the improvement comprises:

the conditioning assembly has venturi means for impelling the conditioning fluid through the product loading horn at a velocity greater than that velocity at which the conditioning fluid is supplied to the conditioning assembly; and the venturi means includes an exhaust port in the conditioning assembly, an outer sleeve in fluid passing communication with the exhaust port, and an inner sleeve having a discharge end opening into the outer sleeve, wherein the inner sleeve is in communication with a supply of fluid under a pressure greater than atmospheric pressure, and the outer sleeve has a throat downstream of the discharge end of the inner sleeve.

5. The apparatus of claim 4, wherein the inner sleeve has a narrowing taper at the discharge end.

6. The apparatus of claim 4, wherein an exhaust ring is located between the exhaust port and the outer sleeve, whereby conditioning fluid passing out of the conditioning assembly has a generally unrestricted flow between the exhaust port and the throat.

7. The apparatus of claim 1, wherein the conditioning assembly is spaced from the slitting means to provide a gap which is downstream of an exhaust port of the conditioning assembly.

8. The apparatus of claim 1, wherein the means for removing the slit casing from the sausage is enclosed and includes top panel means for collecting conditioning fluid passing through the slitting means with the slit casing removed from the sausages.

9. The apparatus of claim 1, wherein the conditioning assembly includes a key hole and anchoring pin assembly for removal of the product loading horn from the apparatus.

10. In a sausage casing removal apparatus comprising a sausage trackway and means for conveying sausages along the trackway, the trackway having a plurality of operational stations including (a) a conditioning assembly having a product loading horn having means for contacting the casing of the sausage with conditioning fluid while the sausage is conveyed along the trackway, (b) means for longitudinally slitting the conditioned casing, and (c) means for removing the slit casing from the sausages, wherein the improvement comprises:

the conditioning assembly has venturi means for impelling the conditioning fluid through the product loading horn at a velocity greater than that velocity at which the conditioning fluid is supplied to the conditioning assembly; and the venturi means includes: a plurality of restricted passageways through the product loading horn, a peripheral channel overlying the restricted passageways, and a manifold in fluid passing communication with said peripheral channel, in combination with an exhaust port through the product loading horn at a location downstream of the restricted passageways, an outer sleeve in fluid passing communication with the exhaust port and an inner sleeve having a discharge end opening into the outer sleeve for discharging pressurized fluid into a narrowing throat of the outer sleeve.

11. In a sausage casing removal apparatus comprising a sausage trackway and means for conveying sausages along the trackway, the trackway having a plurality of operational stations including (a) a conditioning assembly having a product loading horn having means for contacting the casing of the sausage with conditioning fluid while the sausage is conveyed along the trackway, (b) means for longitudinally slitting the conditioned casing, and (c) means for removing the slit casing from the sausages, said slit casing removing means being downstream of said conditioning assembly, the improvement comprising:

the conditioning assembly has venturi means for impelling the conditioning fluid through the product loading horn at a velocity greater than that velocity at which the conditioning fluid is supplied to the conditioning assembly, the venturi means includes a plurality of restricted passageways through the product loading horn of the conditioning assembly, a peripheral channel of the conditioning assembly overlying the restricted passageways, and a manifold in fluid passing communication with the peripheral channel, and the restricted passageways have a total cross-sectional area less than a peripheral area of the peripheral channel, the peripheral area being an area defined on the product loading horn by the peripheral channel.

* * * * *

UNITED STATES PATENT AND TRADEMARK OFFICE
CERTIFICATE OF CORRECTION

PATENT NO. : 4,414,707
DATED : November 15, 1983
INVENTOR(S) : Ernest E. Koken

It is certified that error appears in the above-identified patent and that said Letters Patent are hereby corrected as shown below:

At Column 2, line 40, change "stream" to --steam--.

At Column 2, line 42, change "channesl" to --channels--.

At Column 2, line 50, change "passageway" to --passageways--.

Signed and Sealed this

Eighth Day of May 1984

[SEAL]

Attest:

GERALD J. MOSSINGHOFF

Attesting Officer    Commissioner of Patents and Trademarks